(12) United States Patent
Karamatsu et al.

(10) Patent No.: US 6,652,306 B2
(45) Date of Patent: Nov. 25, 2003

(54) POWER FEEDING CONNECTOR APPARATUS

(75) Inventors: Masayuki Karamatsu, Shizuoka (JP); Shigeo Mori, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/152,813

(22) Filed: May 23, 2002

(65) Prior Publication Data

US 2002/0177348 A1 Nov. 28, 2002

(30) Foreign Application Priority Data

May 24, 2001 (JP) ..................................... P2001-155713

(51) Int. Cl.⁷ ............................................... H01R 13/62
(52) U.S. Cl. ........................ 439/310; 439/157; 439/352
(58) Field of Search ................................ 439/352, 357, 439/310, 159, 160, 157, 34

(56) References Cited

U.S. PATENT DOCUMENTS

| | | | | |
|---|---|---|---|---|
| 5,417,579 A | * | 5/1995 | Yoshioka et al. | 439/310 |
| 5,545,059 A | * | 8/1996 | Nelson | 439/583 |
| 5,558,533 A | * | 9/1996 | Hashizawa et al. | 439/310 |
| 5,577,920 A | * | 11/1996 | Itou et al. | 439/34 |
| 5,674,086 A | * | 10/1997 | Hashizawa et al. | 439/310 |
| 5,803,760 A | * | 9/1998 | Ito et al. | 439/310 |
| 5,873,737 A | * | 2/1999 | Hashizawa et al. | 439/39 |
| 6,123,569 A | * | 9/2000 | Fukushima et al. | 439/456 |
| 6,203,355 B1 | * | 3/2001 | Neblett et al. | 439/372 |
| 6,283,781 B1 | * | 9/2001 | Mori | 439/310 |

* cited by examiner

Primary Examiner—Gary Paumen
Assistant Examiner—James R. Harvey
(74) Attorney, Agent, or Firm—Sughrue Mion, PLLC

(57) ABSTRACT

An operating lever (23) can be swung to and positioned at three positions, that is, a connected position where terminals (25) are connected respectively to terminals in a power receiving-side connector (30), a provisionally-retained position where the connection of the terminals (25) to the respective terminals in the power receiving-side connector (30) is canceled, and a canceled position where the connection of the terminals (25) to the respective terminals in the power receiving-side connector (30) is canceled, and the retaining of a casing (22) on the power receiving-side connector (30) by lock arms (26) is canceled. A lever stopper (24) positions the operating lever (23) relative to the casing (22), or cancels the positioning of the operating lever (23) relative to the casing (22) by the gripping of the lever stopper in the operation of the lever.

5 Claims, 19 Drawing Sheets

POWER FEEDING CONNECTOR APPARATUS

The present application is based on Japanese Patent Application No. 2001-155713, which is incorporated herein by reference.

BACKGROUND OF THE INVENTION

1. Field of the Invention

This invention relates to a power feeding connector apparatus. The power feeding connector apparatus herein means a combination of a power feeding-side connector and a power receiving-side connector, in which in the charging, for example, of an electric vehicle (EV), the power feeding-side connector and the power receiving-side connector are electrically connected together through the connection of terminals upon fitting of the two connectors relative to each other, and more particularly to a power feeding connector apparatus as well as the power feeding-side connector itself, in which the power feeding-side connector can be disconnected from the power receiving-side connector with one action without the need for changing the operator's grip on the connector.

2. Related Art

FIGS. 14 to 19 show one conventional power feeding connector apparatus 40 which comprises a power feeding-side connector 41, connected to a power supply apparatus, and a power receiving-side connector 42 which is provided at the power-receiving side, and can fit on the power feeding-side connector 41.

The power feeding-side connector 41 and the power receiving-side connector 42 are electrically connected together through the connection of a terminal 43 upon fitting of the power feeding-side connector 41 into the power receiving-side connector 42.

The power feeding-side connector 41 comprises a housing 45, mounted on a casing 44 for movement relative thereto, an operating lever 46, swingably mounted on the casing 44, a cancellation button 47, and lock arms 48.

The terminal 43 is incorporated in the housing 45. The operating lever 46 is connected to the housing 45, and this operating lever 46, when swung, causes the housing 45 to move relative to the casing 44.

The cancellation button 47 is engaged at its distal end 47a with a retaining portion 46a of the operating lever 46, thereby retaining the operating lever 46 in a connected position. Lock claws 48a of the lock arms 48 are engaged with the power receiving-side connector 42, thereby positioning the casing 44 relative to the power receiving-side connector 42.

In this power feeding connector apparatus 40, when the power feeding-side connector 41 is to be disconnected from the power receiving-side connector 42, the cancellation button 47 is pressed (a first pressing operation) in the condition shown in FIGS. 14 and 15 (in which the terminal 43 is connected), so that the retaining of the operating lever 46 by the cancellation button 47 is canceled.

As a result, the operating lever 46 is swung clockwise (FIG. 16) from a position, indicated in a dots-and-dash line (FIG. 16), to a position indicated in a solid line under the influence of a spring 49. In accordance with the swing of the operating lever 46, the housing 45 is moved relative to the casing 44, and also the connection of the terminal 43 is canceled, so that a provisionally-retained condition is achieved as shown in FIGS. 16 and 17.

In the provisionally-retained condition, when the cancellation button 47 is again pressed (a second pressing operation), the distal end 47a of the cancellation button 47 pushes the right end portion (FIG. 19) of the lock arm 48 upwardly, thereby swinging the lock arm 48 toward the inside of the casing 44.

As a result, the retaining of the casing 44 on the power receiving-side connector 42 by the lock claw 48a of the lock arm 48 is canceled, so that there is achieved a canceled condition (shown in FIGS. 18 and 19) in which the power feeding-side connector 41 can be disconnected from the power receiving-side connector 42.

However, the above conventional power feeding connector apparatus 40 has a problem that when disconnecting the power feeding-side connector 41 from the power receiving-side connector 42, there is needed the two-action disconnecting operation in which the cancellation button 47 are operated or pressed twice.

And besides, when pressing the cancellation button 47, the operator must change his grip on the connector during the disconnecting operation, and therefore the good operability can not be obtained.

SUMMARY OF THE INVENTION

It is an object of this invention to provide a power feeding connector apparatus as well as a power feeding-side connector itself in which the power feeding-side connector can be disconnected from a power receiving-side connector with one action without the need for changing the operator's grip on the connector, thereby achieving the excellent operability.

(1) The above object has been achieved by a power feeding-side connector adapted for fitting relative to a power receiving-side connector, wherein the power feeding-side connector and the power receiving-side connector are electrically connected together through a connection of terminals upon a fitting of the power feeding-side and power receiving-side connectors relative to each other, the power feeding-side connector comprising:

a casing;

a housing for accommodating the terminals, mounted in the casing so as to be movable at a predetermined displacement in a connector-fitting direction and a connector-disconnecting direction;

an operating lever swingably supported on the casing in a plane lying in the connector-fitting direction, the operating lever displacing the housing relative to the casing in the connector-fitting direction or the connector-disconnecting direction by a swing thereof; and a lock arm swingably supported on the casing in a plane lying in the connector-fitting direction, for engaging the power receiving-side connector upon the fitting of the power feeding-side connector relative to the power receiving-side connector, thereby positioning the casing relative to the power receiving-side connector;

wherein the operating lever can be swung and positioned among three of a connected position where the terminals are connected respectively to the terminals in the power receiving-side connector, a provisionally-retained position where the connection of the terminals to the respective terminals in the power receiving-side connector is canceled, and a canceled position where the connection of the terminals to the respective terminals in the power receiving-side connector is canceled, and the retaining of the casing on the power receiving-side connector by the lock arm is canceled.

In the power feeding-side connector of this construction, when disconnecting the power feeding-side connector from the power receiving-side connector, the operating lever is swung from the connected position to the canceled position through the provisionally-retained position.

Thus, in the connected position of the operating lever of the power feeding-side connector, the terminals are connected respectively to the terminals in the power receiving-side connector, and in the provisionally-retained position of the operating lever, the connection of the terminals to the respective terminals in the power receiving-side connector is canceled.

In the canceled position of the operating lever of the power feeding-side connector, the connection of the terminals to the respective terminals in the power receiving-side connector is canceled, and the retaining of the casing on the power receiving-side connector by the lock arm is canceled.

(2) A lever stopper may be movably mounted on the operating lever of the power feeding-side connector; and the lever stopper is selectively engagable with a predetermined portion of the casing, thereby positioning the operating lever relative to the casing, and the lever stopper can be displaced out of engagement with the casing by a gripping of the lever stopper in an operation of the operatinglever, thereby selectively canceling a positioning of the operating lever relative to the casing.

In the power feeding-side connector of this construction, when disconnecting the power feeding-side connector from the power receiving-side connector, the operating lever is swung from the connected position to the canceled position through the provisionally-retained position.

At this time, the lever stopper is engaged with the predetermined portion of the casing, thereby positioning the operating lever relative to the casing, or the lever stopper is displaced out of engagement with the casing by the gripping of the lever stopper in the operation of the lever, thereby canceling the positioning of the operating lever relative to the casing.

(3) Further, the power feeding-side connector may be provided with a first engagement portion formed on the casing, and a second engagement portion formed on the housing, wherein the lever stopper is urged by a stopper spring and is engagable with the first engagement portion and the second engagement portion, thereby holding the operating lever in the connected position and the provisionally-retained position relative to the casing, respectively.

(4) In the invention, a joint bar may interconnects the operating lever and the housing, and the operating lever, displaces the housing relative to the casing through the joint bar.

(5) The invention also provides a power feeding connector apparatus comprising a power feeding-side connector according to the above and a power receiving connector engagable with the power feeding-side connector.

DETAILED DESCRIPTION OF THE PREFERRED EMBODIMENTS

A preferred embodiment of the present invention will now be described in detail with reference to the drawings.

Figure 1:
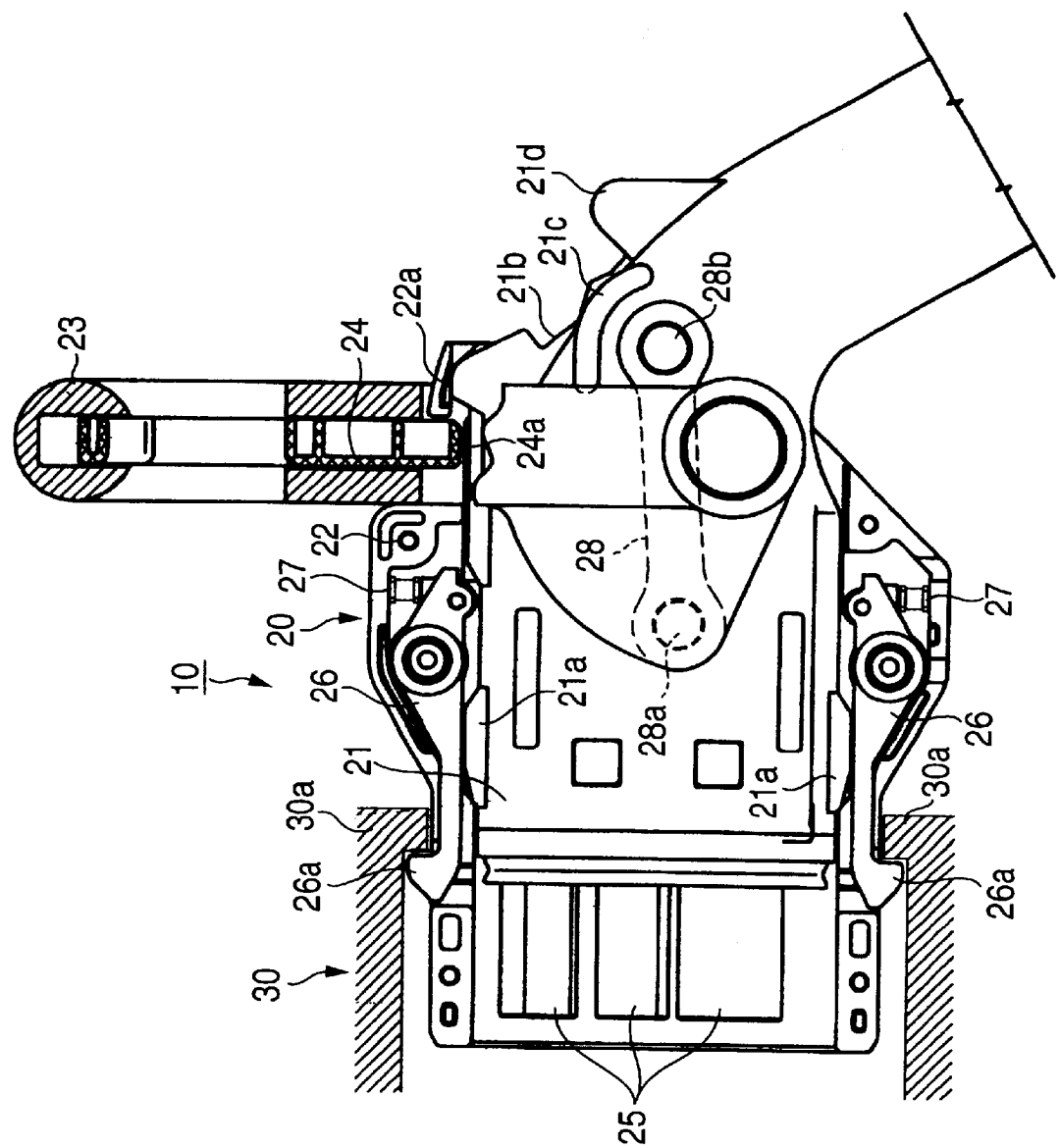
FIG. 1 is a cross-sectional view showing an important portion of one preferred embodiment of a power feeding connector apparatus of the invention in a connected condition.
Figure 2:
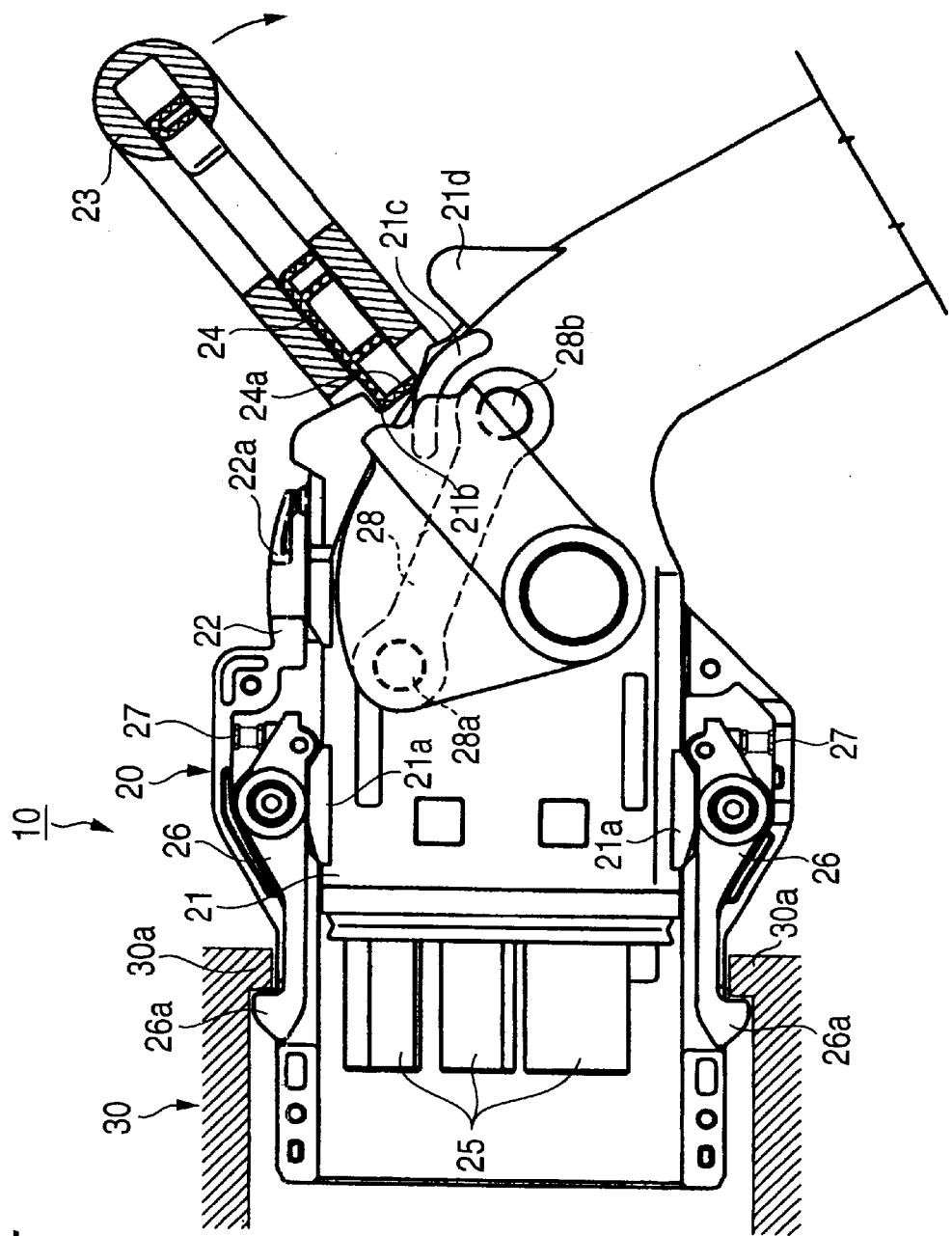
FIG. 2 is a cross-sectional view of the important portion of the power feeding connector apparatus of FIG. 1 in a provisionally-retained condition.
Figure 3:
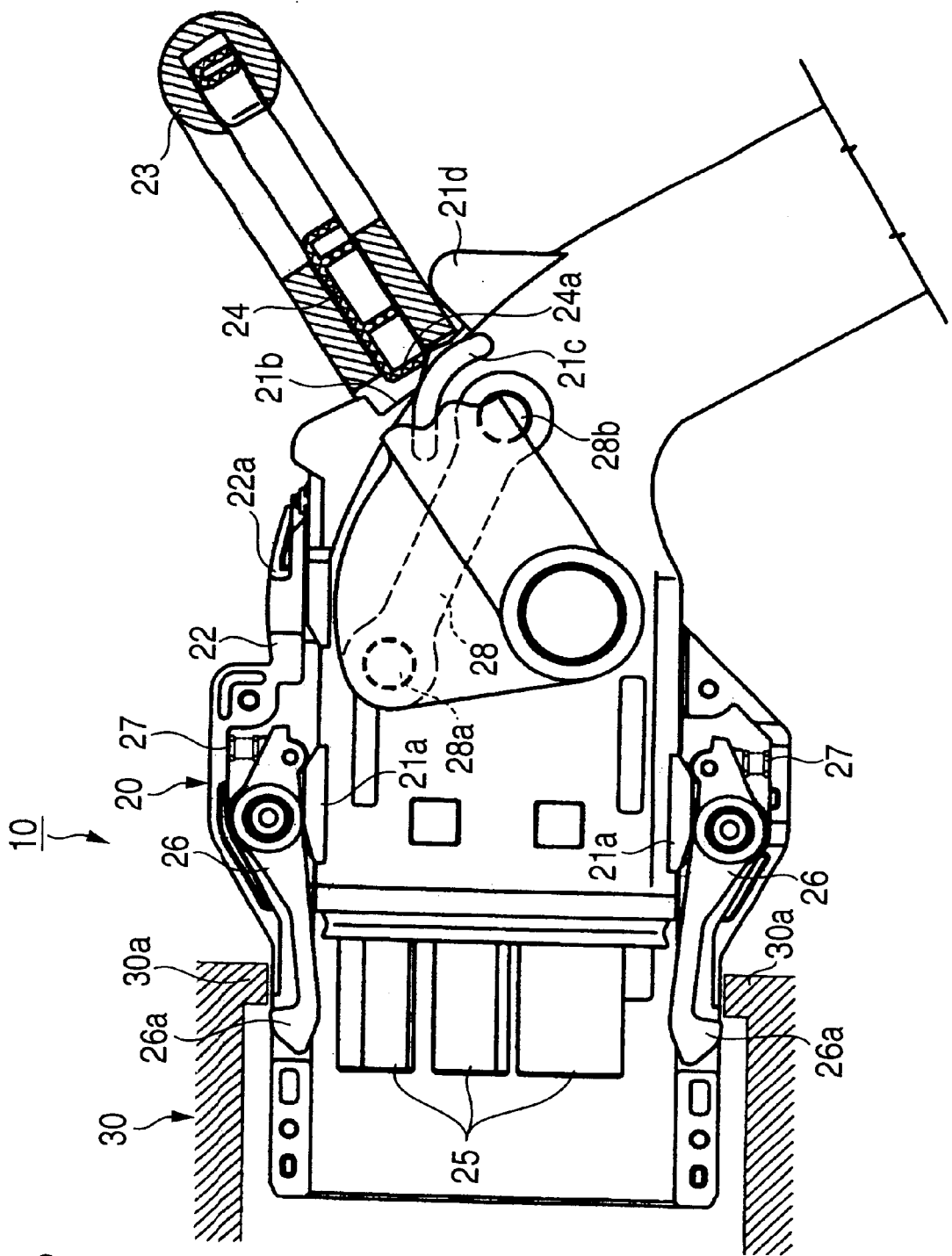
FIG. 3 is a cross-sectional view of the important portion of the power feeding connector apparatus of FIG. 1 in a canceled condition.
Figure 4:
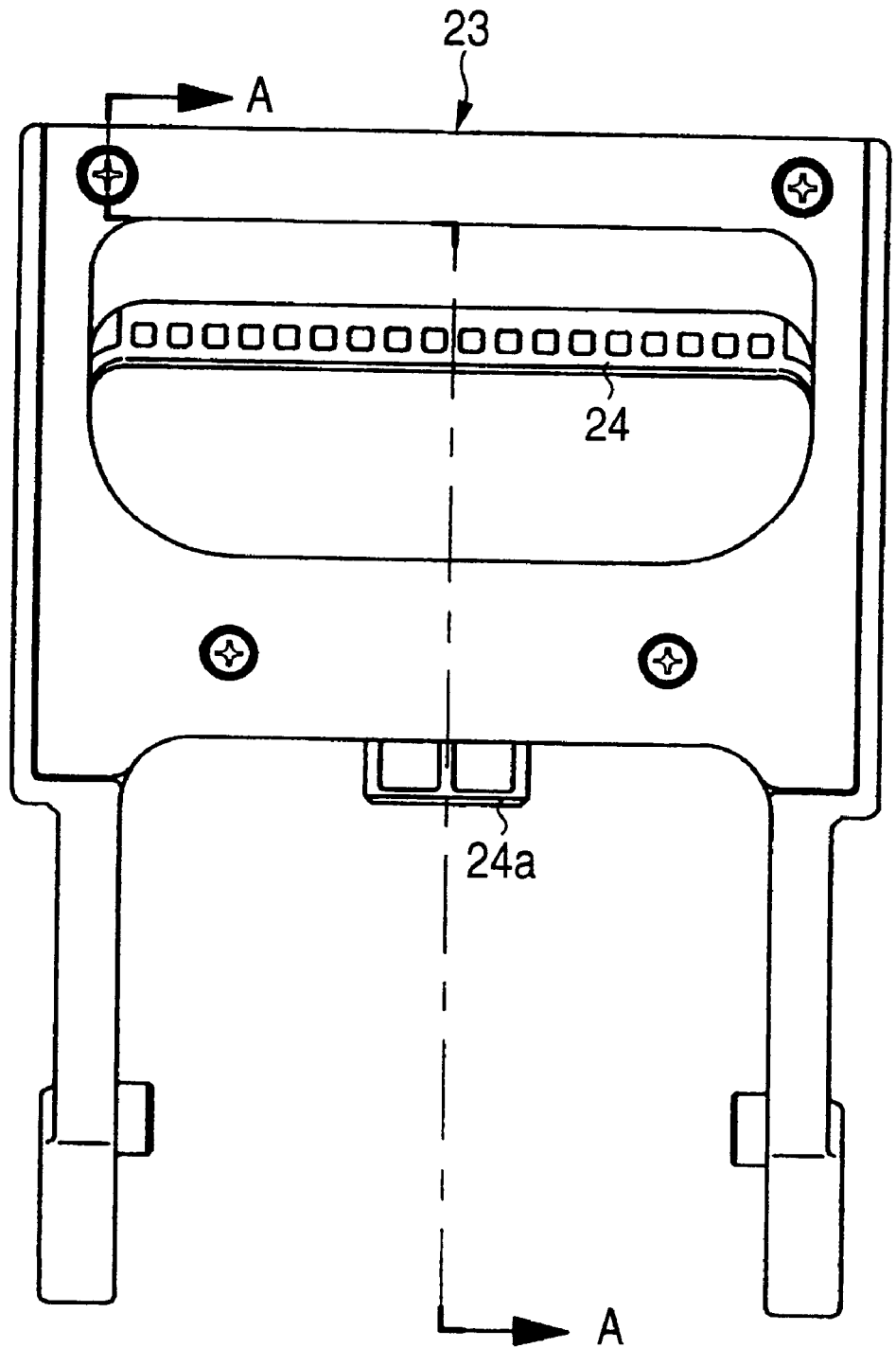
FIG. 4 is a front-elevational view of an operating lever of a power feeding-side connector of the power feeding connector apparatus of FIG. 1.

FIG. 1 is a cross-sectional view showing an important portion of one preferred embodiment of a power feeding connector apparatus of the invention in a connected condition, FIG. 2 is a cross-sectional view of the important portion of the power feeding connector apparatus of FIG. 1 in a provisionally-retained condition, FIG. 3 is a cross-sectional view of the important portion of the power feeding connector apparatus of FIG. 1 in a canceled condition, and FIG. 4 is a front-elevational view of an operating lever of a power feeding-side connector of the power feeding connector apparatus of FIG. 1.

Figure 5:
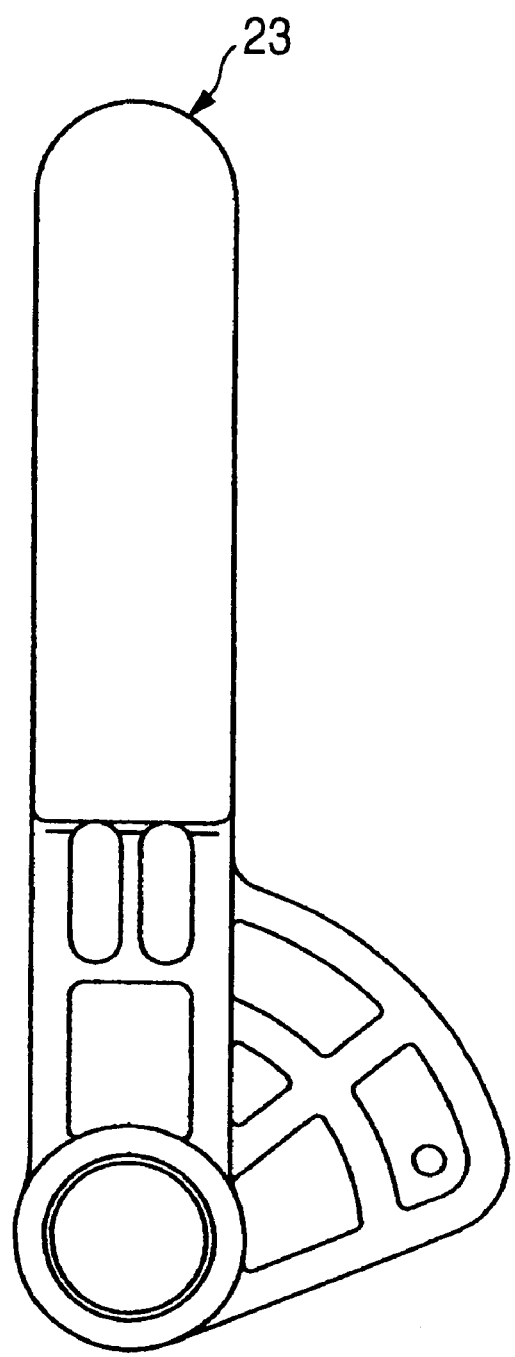
FIG. 5 is a right side-elevational view of the operating lever of FIG. 4.
Figure 6:
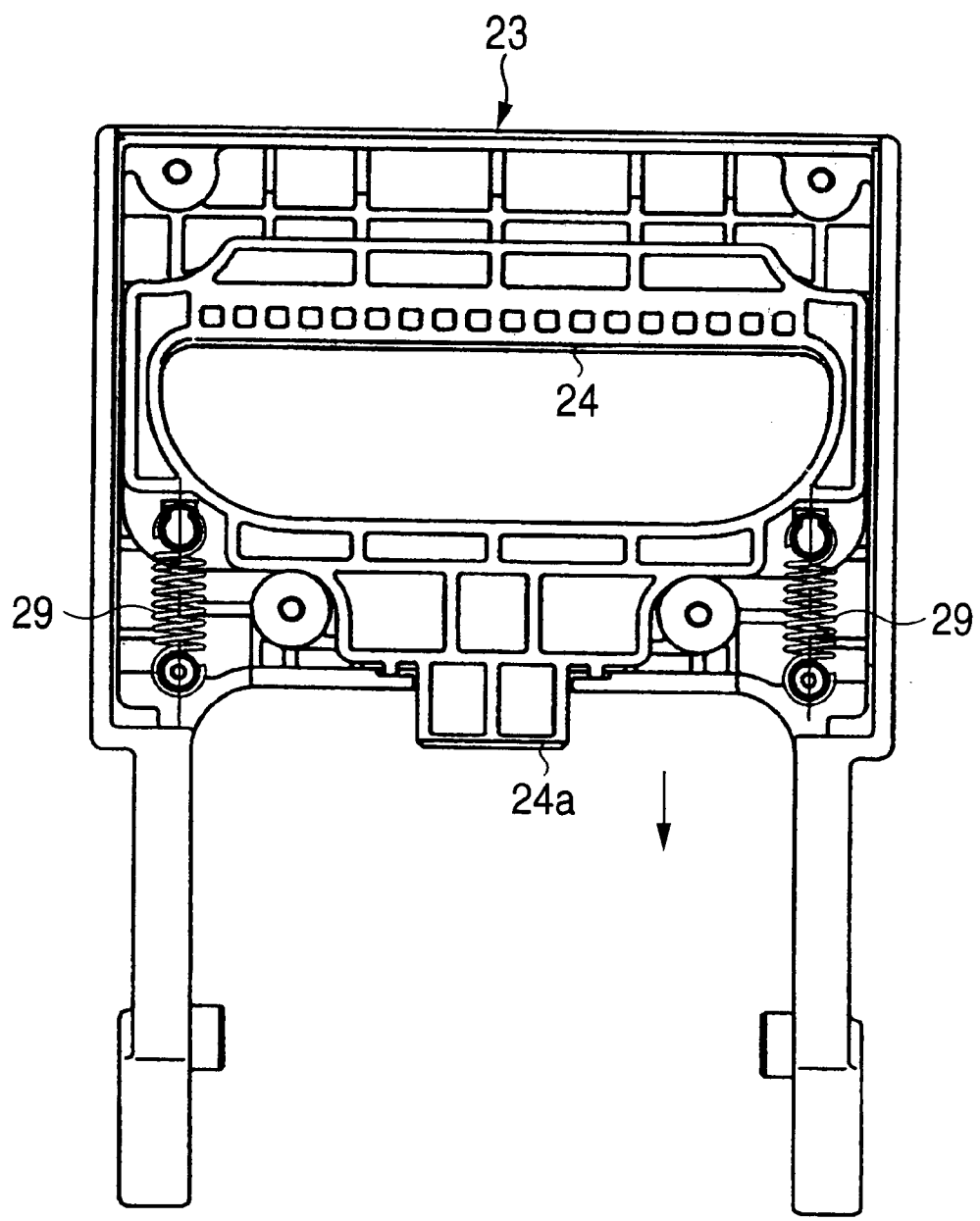
FIG. 6 is a front-elevational view, showing the operating lever of FIG. 4 before a cover is attached to this operating lever.
Figure 7:
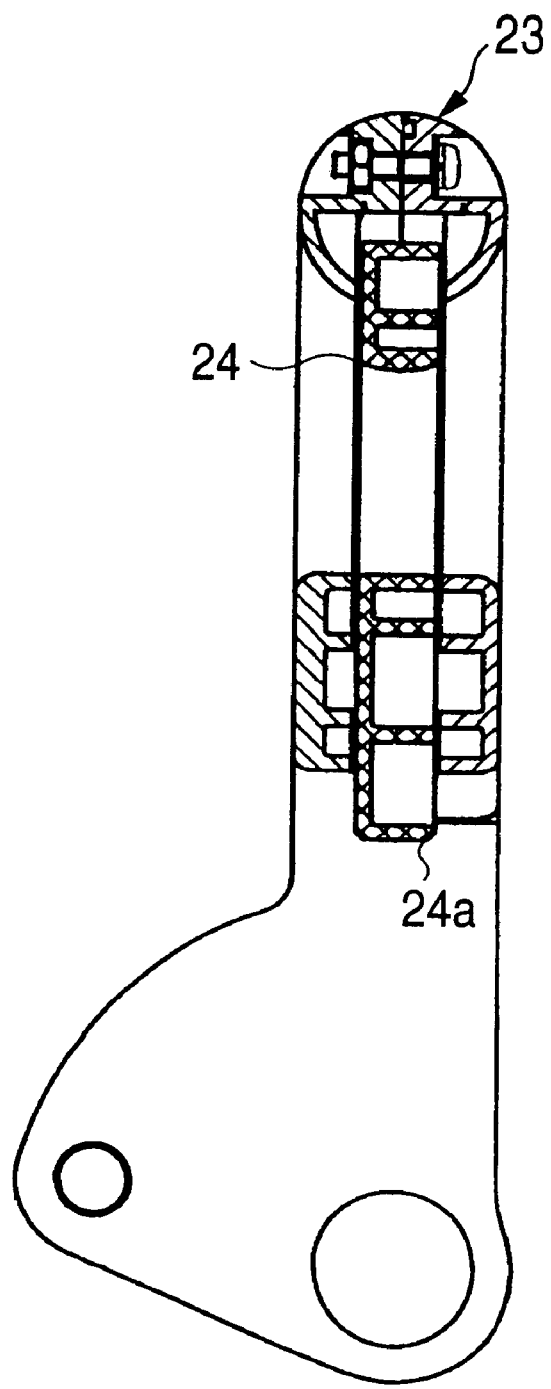
FIG. 7 is a cross-sectional view of the operating lever taken along the line A—A of FIG. 4.

FIG. 5 is a right side-elevational view of the operating lever of FIG. 4, FIG. 6 is a front-elevational view, showing the operating lever of FIG. 4 before a cover is attached to this operating lever, and FIG. 7 is a cross-sectional view of the operating lever taken along the line A—A of FIG. 4.

Figure 8:
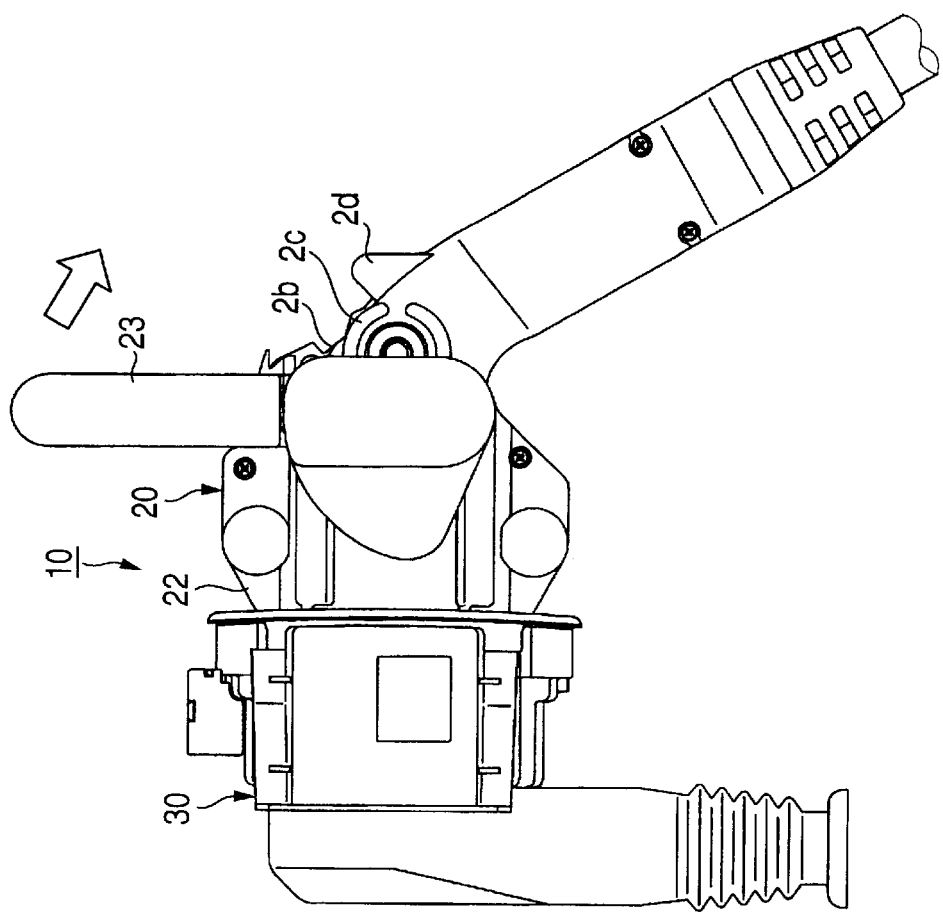
FIG. 8 is a side-elevational view of the power feeding connector apparatus of FIG. 1.
Figure 9:
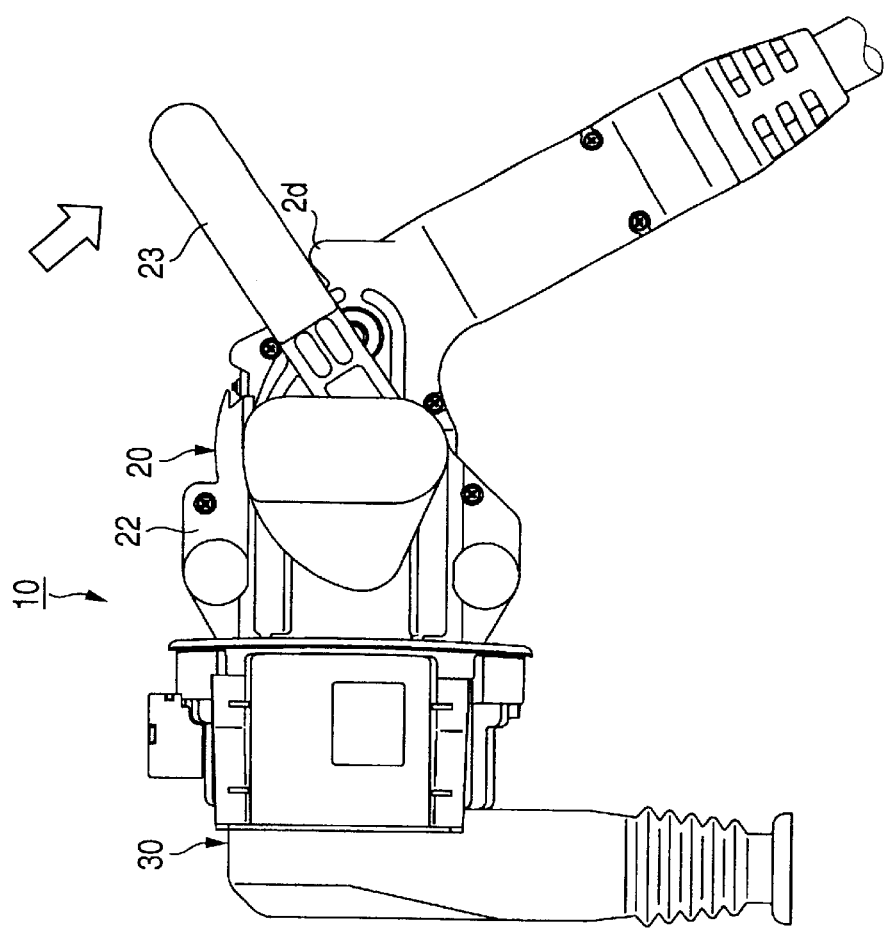
FIG. 9 is a side-elevational view of the power feeding connector apparatus of FIG. 3.
Figure 10:
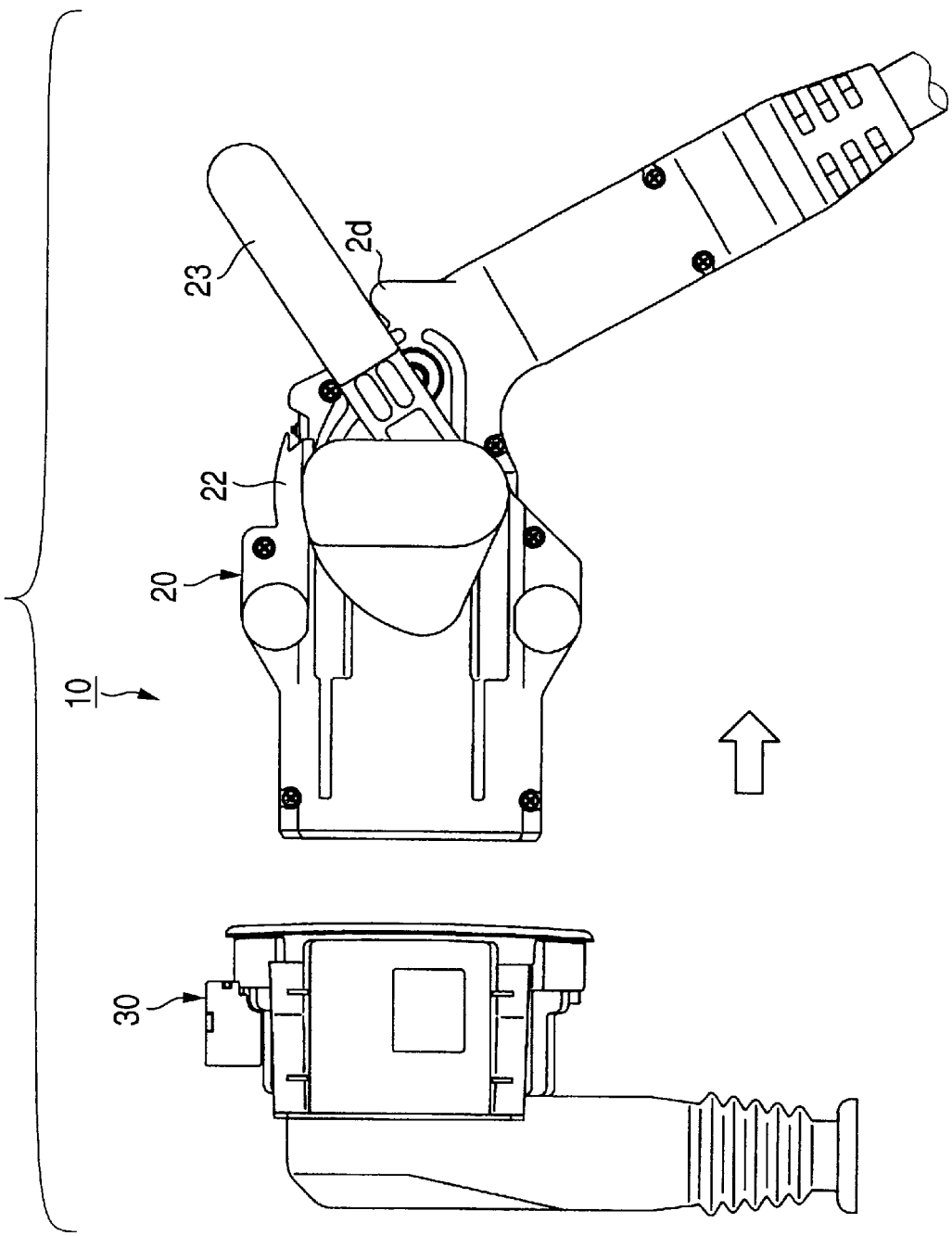
FIG. 10 is a side-elevational view of the power feeding connector apparatus in a disconnected condition.

FIG. 8 is a side-elevational view of the power feeding connector apparatus of FIG. 1, FIG. 9 is a side-elevational view of the power feeding connector apparatus of FIG. 3, and FIG. 10 is a side-elevational view of the power feeding connector apparatus in a disconnected condition.

Figure 11:
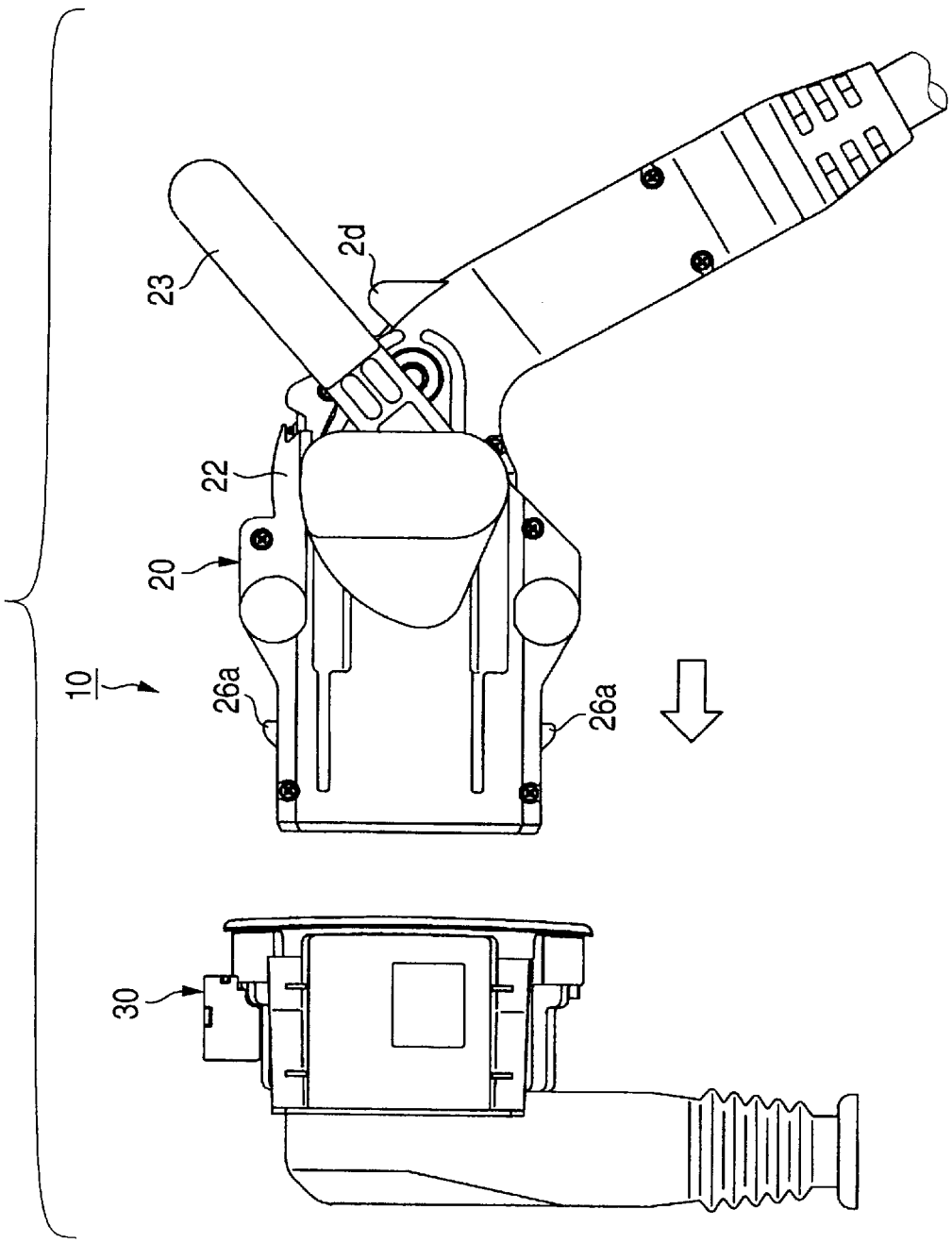
FIG. 11 is a side-elevational view of the power feeding connector apparatus, showing a condition before it is brought into a fitted condition.
Figure 12:
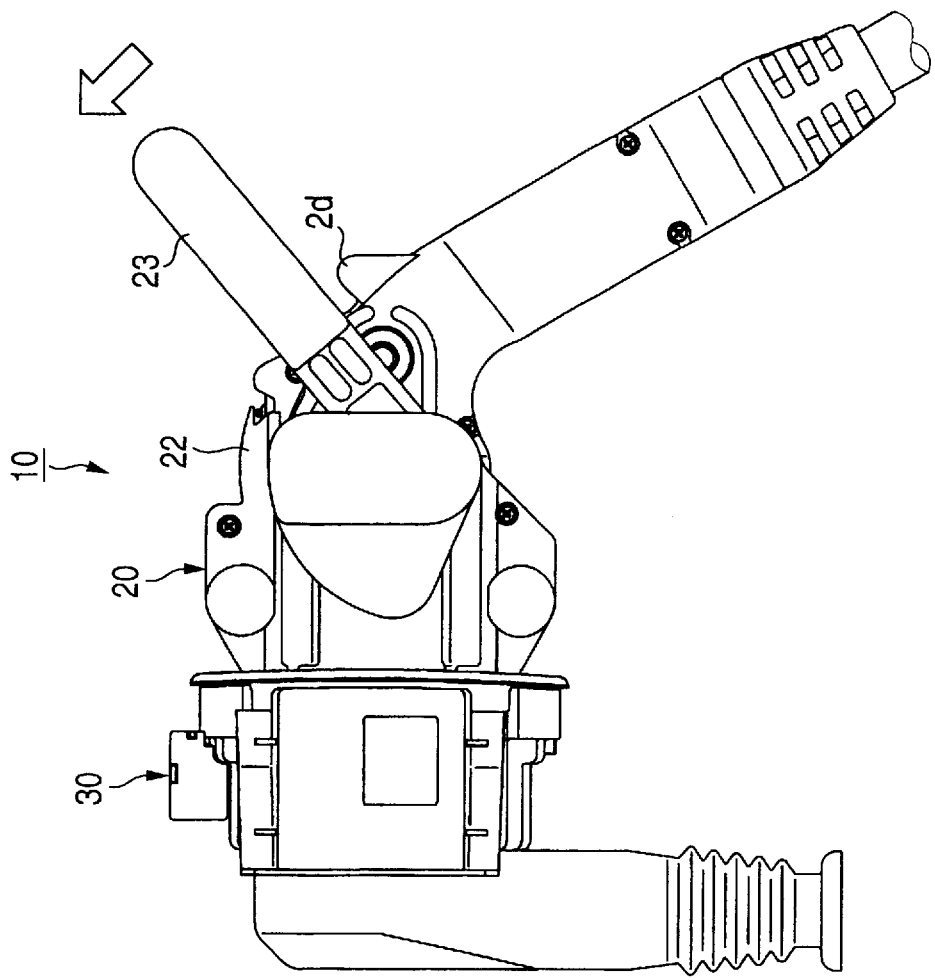
FIG. 12 is a side-elevational view of the power feeding connector apparatus in the provisionally-retained condition.
Figure 13:
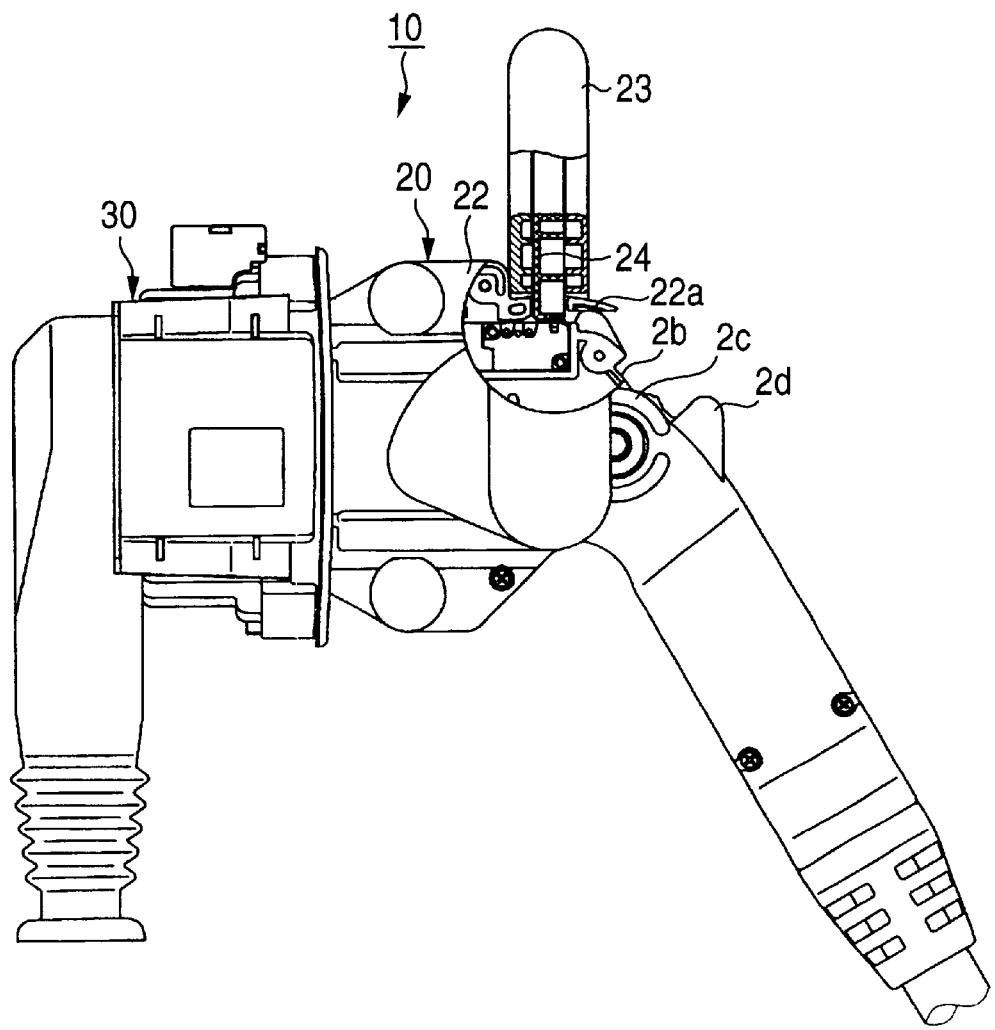
FIG. 13 is a side-elevational view of the power feeding connector apparatus in the connected condition.
Figure 14:
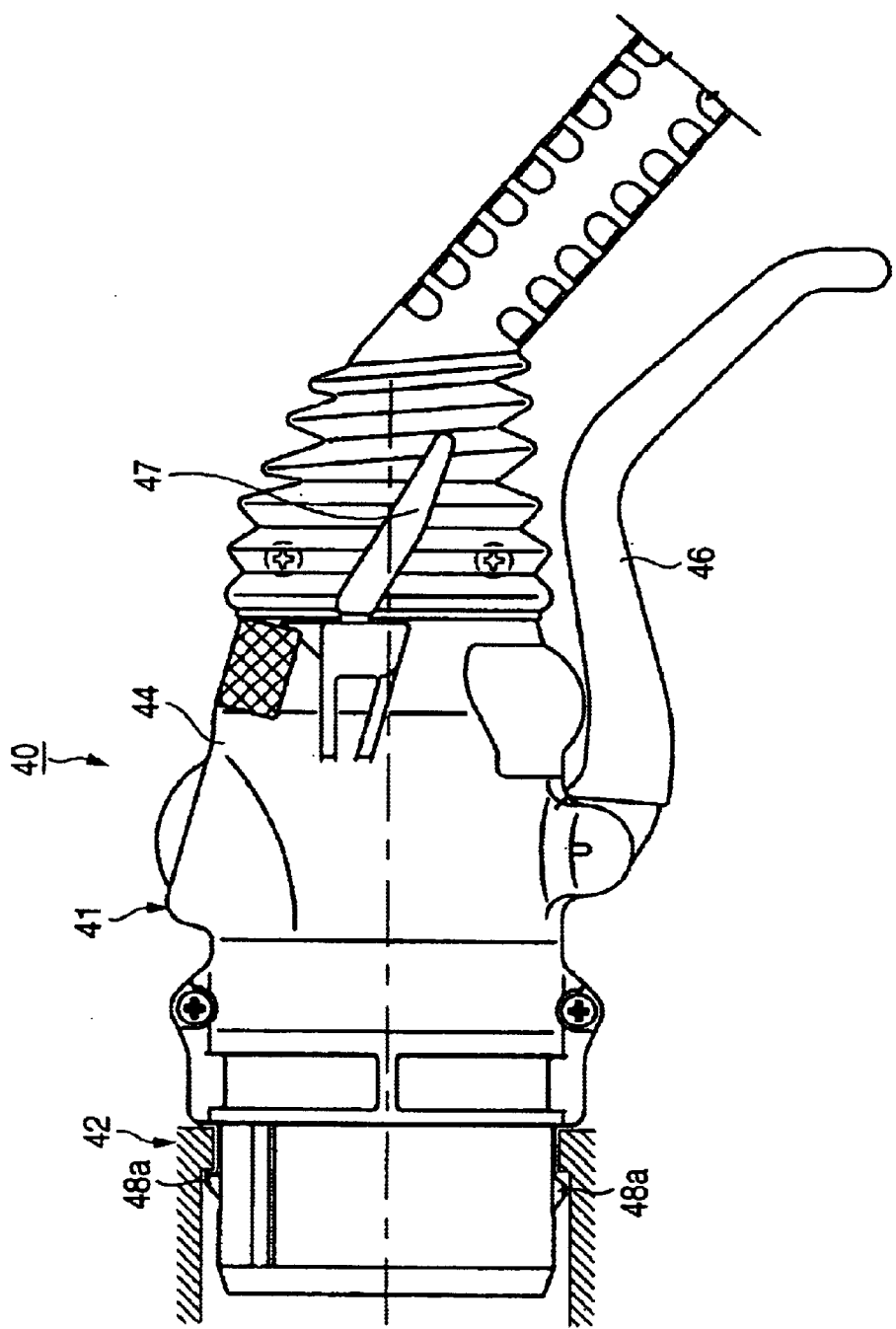
FIG. 14 is a side-elevational view of an important portion of a conventional power feeding connector apparatus.
Figure 15:
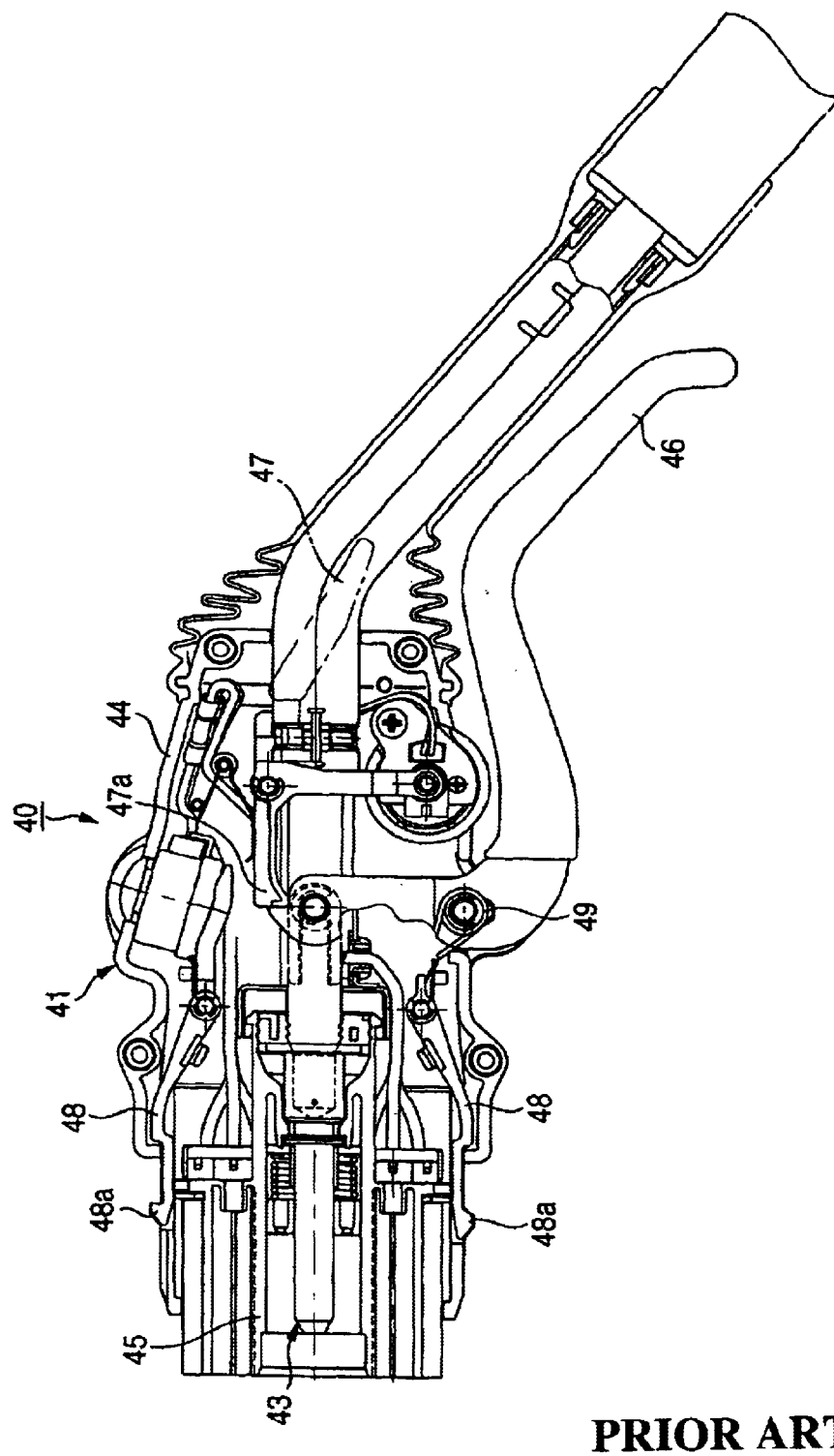
FIG. 15 is a cross-sectional view of the power feeding connector apparatus of FIG. 14.
Figure 16:
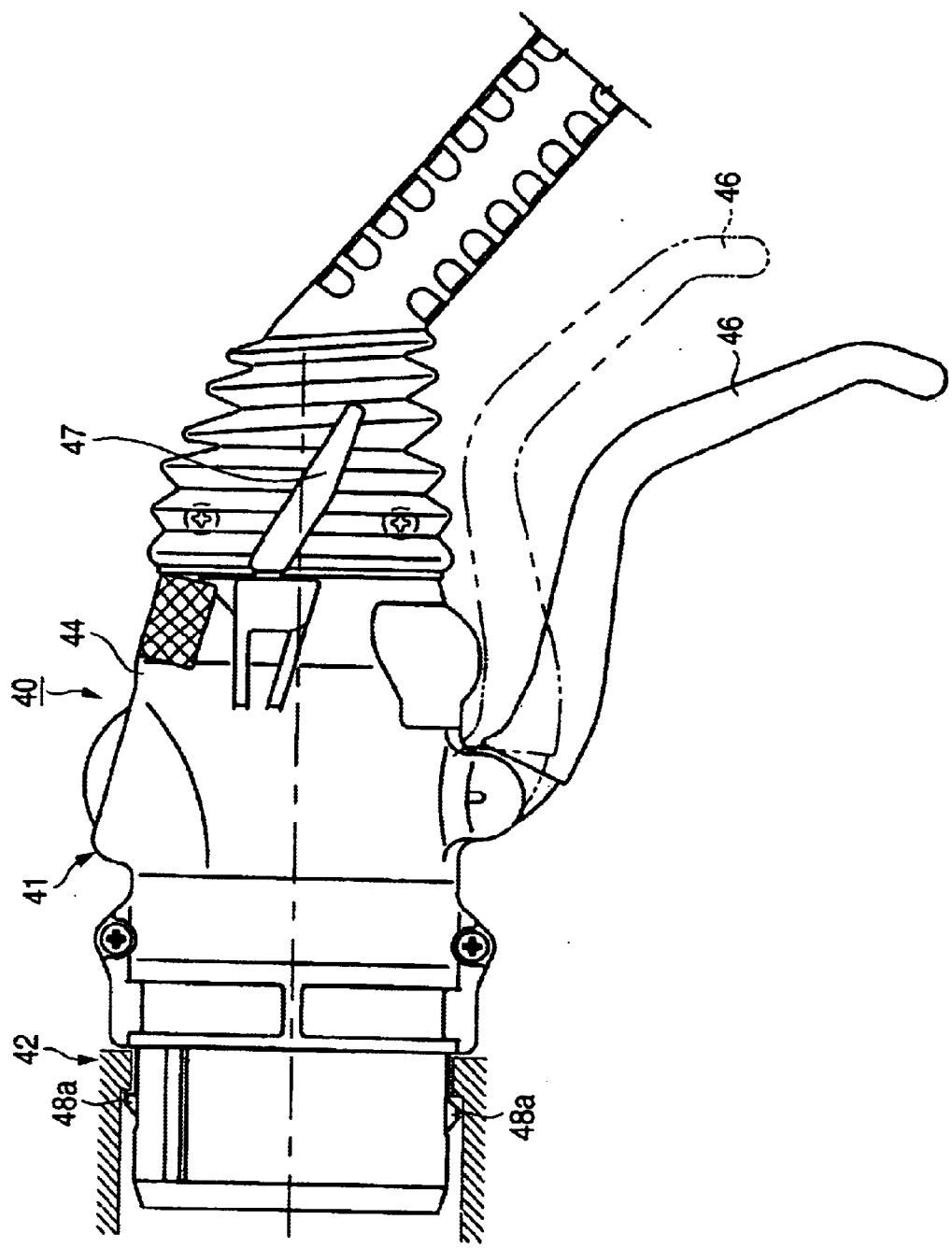
FIG. 16 is a side-elevational view of an important portion of the power feeding connector apparatus of FIG. 14 in a provisionally-retained condition.
Figure 17:
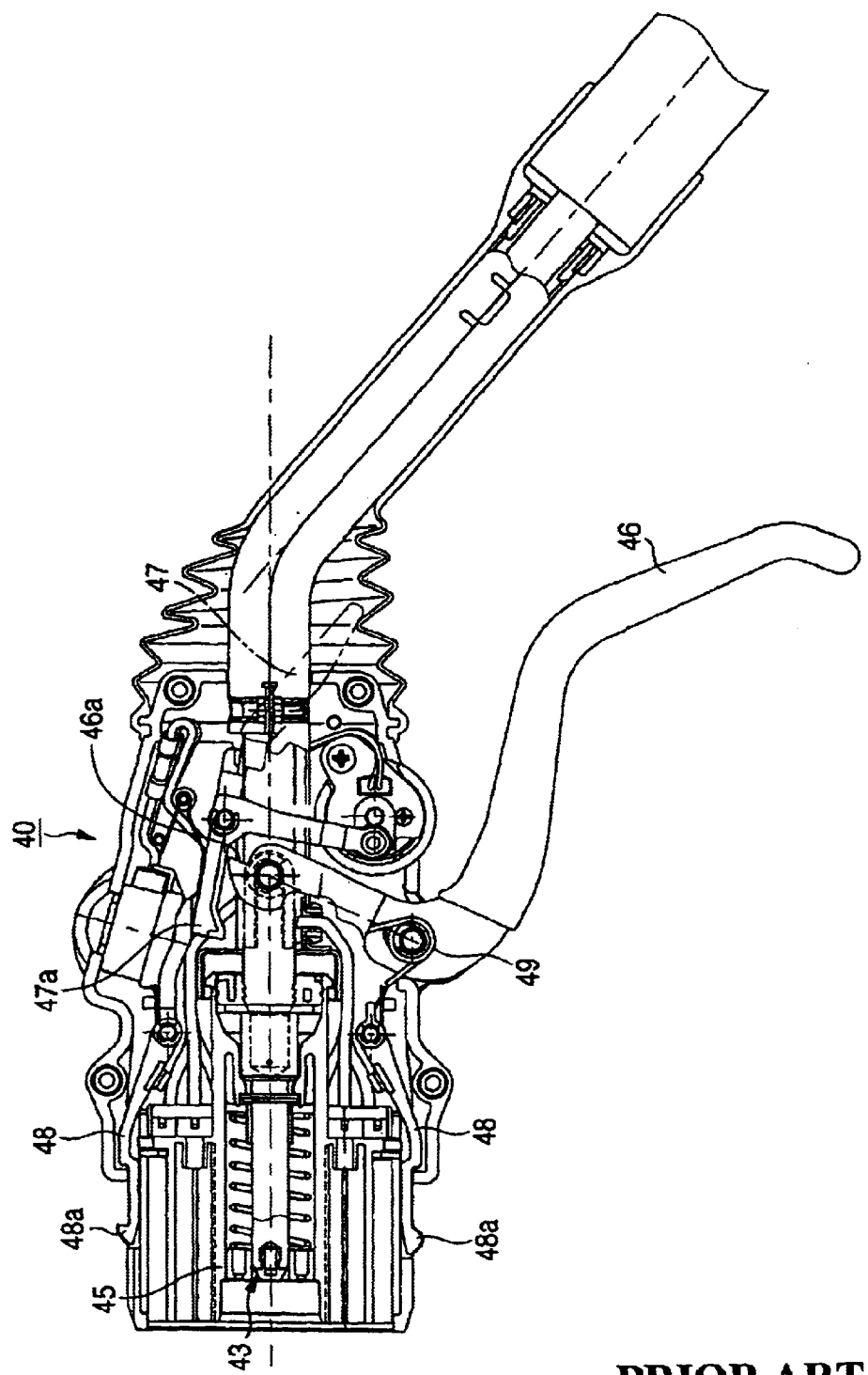
FIG. 17 is a cross-sectional view of the power feeding connector apparatus of FIG. 16.
Figure 18:
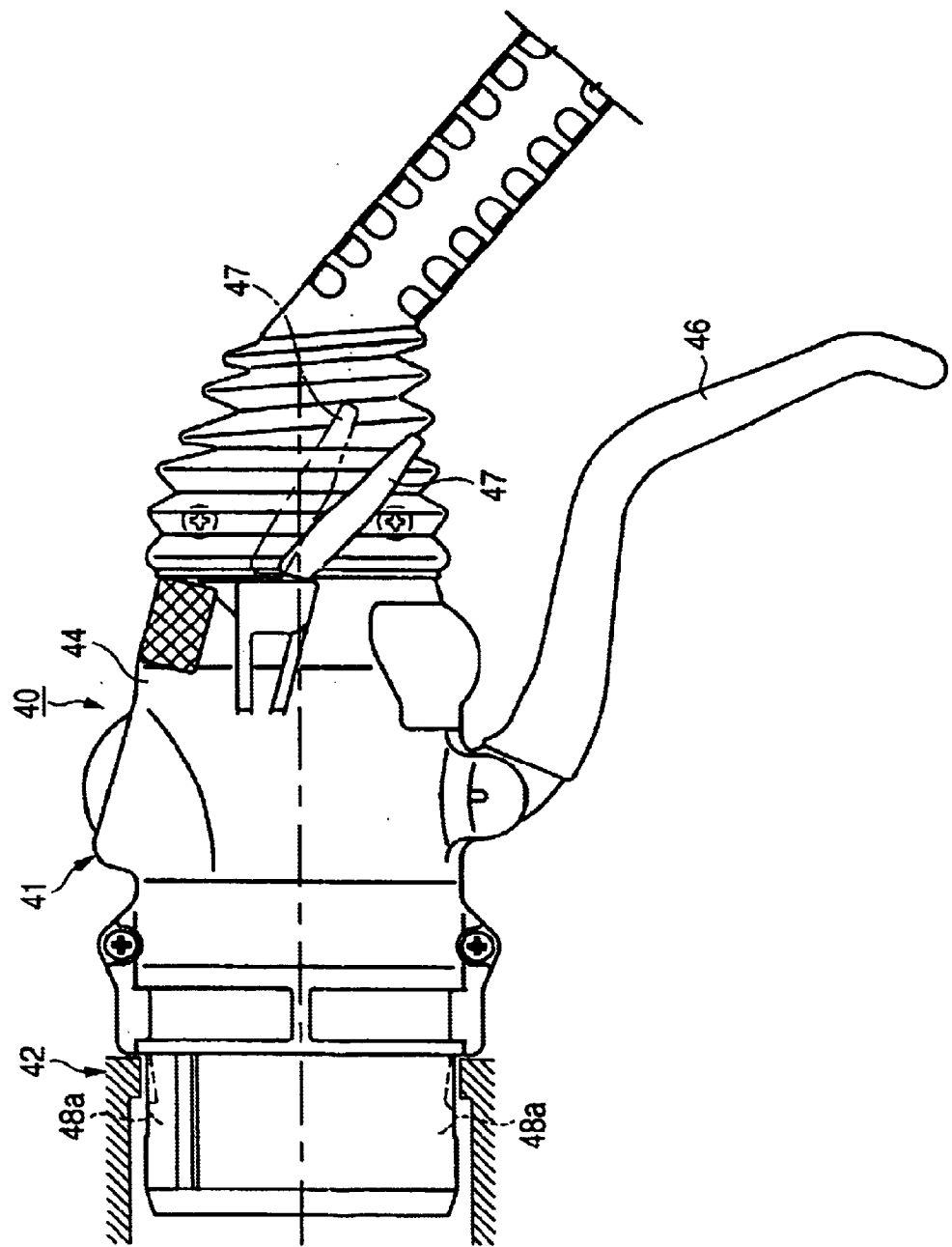
FIG. 18 is a side-elevational view of an important portion of the power feeding connector apparatus of FIG. 14 in a canceled condition.
Figure 19:
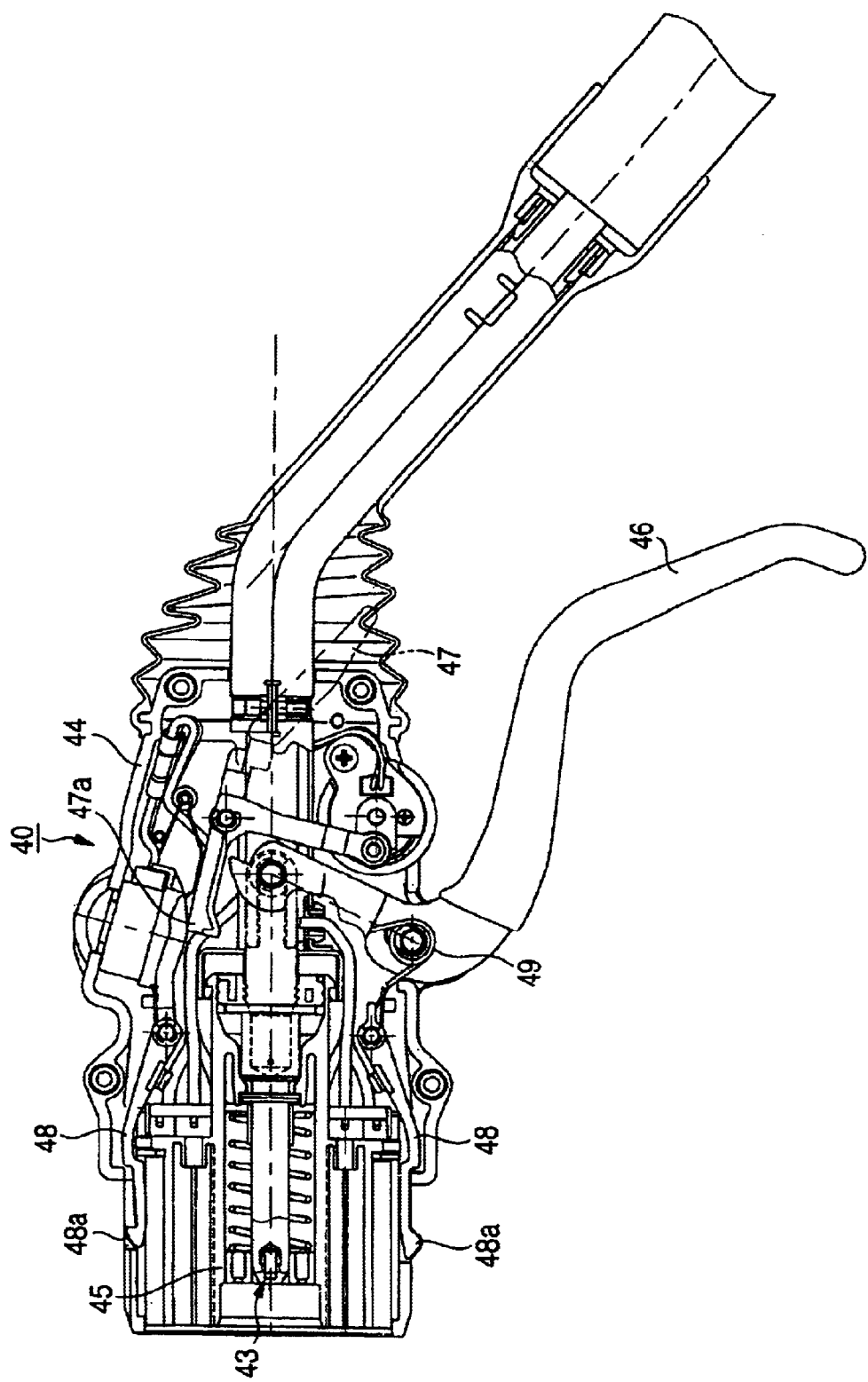
FIG. 19 is a cross-sectional view of the power feeding connector apparatus of FIG. 18.

FIG. 11 is a side-elevational view of the power feeding connector apparatus, showing a condition before it is brought into a fitted condition, FIG. 12 is a side-elevational view of the power feeding connector apparatus in the provisionally-retained condition, and FIG. 13 is a side-elevational view of the power feeding connector apparatus in the connected condition.

Referring to FIGS. 1 to 7, the power feeding connector apparatus 10 comprises the power feeding-side connector 20, connected to a power supply apparatus (not shown), and a power receiving-side connector 30 which is provided at a power-receiving side (not shown), such as a vehicle, and can fit on the power feeding-side connector 20.

In the power feeding connector apparatus 10, the power feeding-side connector 20 and the power receiving-side connector 30 are electrically connected together through the connection of terminals 25 upon fitting of the power feeding-side connector 20 into the power receiving-side connector 30.

In the power feeding-side connector 20, a housing 21 is mounted on a casing 22 so as to be displaced in a predetermined amount in a connector-fitting direction (left-hand direction in FIG. 1) and a connector-disconnecting direction (right-hand direction in FIG. 1).

When fitting the power feeding-side connector 20 into the power receiving-side connector 30, the housing 21 is displaced as a result of manual operation of the operating lever 23 and a lever stopper 24, so that the terminals 25, incorporated in the housing 21, are connected respectively to terminals (not shown) in the power receiving-side connector 30. As a result, the power feeding-side connector 20 is electrically connected to the power receiving-side connector 30.

A pair of upper and lower lock arms 26 (FIG. 1) are supported on the casing 22 so as to be swung in clockwise and counterclockwise directions in a plane lying in the connector-fitting direction.

When the power feeding-side connector 20 is fitted into the power-receiving-side connector 30, lock claws 26a, formed respectively on the lock arms 26, are retained respectively by retaining portions 30a, formed on the power receiving-side connector 30, thereby positioning the casing 22 relative to the power receiving-side connector 30.

Namely, the lock arms 26 are normally urged by springs 27 such that the lock claws 26a thereof are urged away from each other in their respective opening directions (upward and downward directions in FIG. 1).

When the operating lever 23 is located in a connected position (described later), the lock claws 26a of the opened lock arm 26 are retained respectively by the retaining portions 30a of the power receiving-side connector 30, thereby holding the casing 22 against movement relative to the power receiving-side connector 30 in the connector-disconnecting direction (right-hand direction in FIG. 1).

When the operating lever 23 is disposed in a canceled position (described later), the lock arms 26 are engaged respectively with projections 21a, formed on the housing 21, and therefore are pressed by these projections to be swung, so that the lock claws 26a are displaced in their respective closing directions (opposite to their respective opening directions) toward the inside of the connector.

As a result, the retaining engagement of the lock claw 26a of each lock arm 26 with the corresponding retaining portion 30a of the power receiving-side connector 30 is canceled, thereby allowing the casing 22 to move in the connector-disconnecting direction.

The operating lever 23 is supported on the casing 22 so as to be swung in the clockwise and counterclockwise directions (FIG. 1) in a plane lying in the connector-fitting direction. The operating lever 23, when manually operated, displaces the housing 21 in the predetermined amount in the connector-fitting direction (left-hand direction in FIG. 1) and the connector-disconnecting direction (right-hand direction in FIG. 1) relative to the casing 22 through a joint bar 28 interconnecting the operating lever 23 and the housing 21.

The joint bar 28 is connected at its left end (FIG. 1) to the operating lever 23 through a pin 28a so as to be displaced relative thereto, and is connected at its right end (FIG. 1) to the housing 21 through a pin 28b so as to be displaced relative thereto.

Namely, the operating lever 23 can be manually swung to be displaced to three positions, that is, the connected position (shown in FIGS. 1 and 8), the provisionally-retained position (shown in FIG. 2) and the canceled position (shown in FIGS. 3 and 9).

In the connected position, the power feeding-side connector 20 is fitted in the power receiving-side connector 30, and the terminals 25 in the power feeding-side connector 20 are connected respectively to the terminals in the power-receiving side connector 30, and the power feeding-side connector 20 is electrically connected to the power receiving-side connector 30.

In the provisionally-retained position, the power feeding-side connector 20 is fitted in the power receiving-side connector 30, and the connection of the terminals 25 of the power feeding-side connector 20 to the respective terminals of the power receiving-side connector 30 is canceled, and the power feeding-side connector 20 is electrically disconnected from the power receiving-side connector 30. In the canceled position, the connection of the terminals 25 of the power feeding-side connector 20 to the respective terminals of the power receiving-side connector 30 is canceled, and the retaining of the casing 22 on the power receiving-side connector 30 by the lock arms 26 is canceled.

The lever stopper 24 is mounted on the operating lever 23 so as to be displaced upward and downward (FIG. 4), and is normally urged downward (FIG. 4) by stopper springs 29.

The lever stopper 24, when not gripped in the operation of the lever, is held in the position, shown in FIG. 4, under the influence of the stopper springs 29, so that a distal end 24a of this lever stopper is engaged with a first engagement portion 22a, formed on the casing 22, or a second engagement portion 21b formed on the housing 21.

As a result, the lever stopper 24 holds or positions the operating lever 23 in the connected position or the provisionally-retained position relative to the casing 22.

The lever stopper 24, when gripped in the operation of the lever or when engaged with a tapering portion 21c formed on the housing 21, is displaced upward (FIG. 4) against the bias of the stopper springs 29, so that the engagement of the distal end 24a with the casing 22 is canceled.

As a result, the lever stopper 24 cancels the positioning of the operating lever 23 relative to the casing 22.

Namely, in the connected position (FIG. 1) of the operating lever 23, the lever stopper 24 is held in the position, shown in FIG. 4, under the influence of the stopper springs 29, so that the distal end 24a is engaged with the first engagement portion 22a of the casing 22.

As a result, the lever stopper 24 holds the operating lever 23 in the connected position.

In the provisionally-retained position (FIG. 2) of the operating lever 23, the lever stopper 24 is held in the position, shown in FIG. 4, under the influence of the stopper springs 29, so that the distal end 24a is engaged with the second engagement portion 21b of the housing 21.

As a result, the lever stopper 24 holds the operating lever 23 in the provisionally-retained position.

In the canceled position (FIG. 3) of the operating lever 23, the distal end 24a of the lever stopper 24 is engaged with and pressed by the tapering portion 21c of the housing 21, so that the lever stopper 24 is displaced upward (FIG. 4) against the bias of the stopper springs 29.

As a result, the lever stopper 24 allows the operating lever 23 to be swung relative to the casing 22.

The operation of this embodiment will now be described.

Referring to FIGS. 1 to 8, the power feeding-side connector 20 is fitted in the power receiving-side connector 30, and the operating lever 23 of the power feeding-side connector 20 is disposed in the connected position. In this condition, the terminals 25 in the power feeding-side connector 20 are connected respectively to the terminals in the power receiving-side connector 30, and the two connectors are electrically connected together.

In this condition, the lever stopper 24 is engaged with the first engagement portion 22a of the casing 22, thereby holding the operating lever 23 of the power feeding-side connector 20 in the connected position.

The lock claws 26a of the opened lock arms 26 are retained respectively by the retaining portions 30a of the power receiving-side connector 30, thereby retaining the casing 22 against movement in the connector-disconnecting direction.

Referring to FIG. 2, for disconnecting the power feeding-side connector 20 from the power receiving-side connector 30, the operating lever 23, disposed in the connected position, is gripped for operating purposes, and the engagement of the lever stopper 24 with the first engagement portion 22a of the casing 22 is canceled as a result of this gripping operation, and the operating lever 23 is swung clockwise (FIG. 2) to the provisionally-retained position.

At this time, in accordance with the swing of the operating lever 23, the housing 21 is displaced right (FIG. 2) in the predetermined amount through the joint bar 28. As a result, the terminals 25 in the power feeding-side connector 20 are disconnected respectively from the terminals in the power receiving-side connector 30.

In the provisionally-retained position of the operating lever 23, the lever stopper 24, released from the operator's grip, is engaged with the second engagement portion 21b of the housing 21 under the influence of the stopper springs 29.

As a result, the operating lever 23 is held in the provisionally-retained position.

Referring to FIGS. 3, 4 and 9, when the operating lever 23 is further swung clockwise (FIG. 3) from the provisionally-retained position, the distal end 24a of the lever stopper 24 is engaged with and pressed by the tapering portion 21c of the housing 21, so that the lever stopper 24 is displaced upward (FIG. 4) against the bias of the stopper springs 29.

As a result, the operating lever 23 is allowed to be swung relative to the casing 22, and this operating lever 23 is swung to the canceled position where the operating lever 23 is engaged with a stopper portion 21d formed on the housing 21.

In the canceled position (see FIGS. 3 and 9) of the operating lever 23, when the operator releases his hold of the operating lever 23, the operating lever 23 is swung to the provisionally-retained position (see FIGS. 2 and 8), with the returning lever stopper 24 sliding over the tapering portion 21c, so that the lever stopper 24 is automatically brought into engagement with the second engagement portion 21b.

In the canceled position of the operating lever 23, the lock arms 26 are pressed respectively by the projections 21a of the housing 21, and therefore are brought out of retaining engagement with the retaining portions 30a of the power receiving-side connector 30, respectively, so that the casing 22 is allowed to be moved in the connector-disconnecting direction.

In this condition, when the operating lever 23 is pulled in the connector-disconnecting direction, the casing 22 is moved in the connector-disconnecting direction, and the power feeding-side connector 20 is disconnected from the power receiving-side connector 30, as shown in FIG. 10.

For fitting the power feeding-side connector 20 into the power receiving-side connector 30 so as to electrically connect the two connectors together, the order of the steps of the above connector-disconnecting operation (see FIGS. 11 to 13) is reversed, that is, the power feeding-side connector 20 is fitted into the power receiving-side connector 30, and the lever is operated, and the terminals 25 in the power feeding-side connector are connected respectively to the terminals in the power receiving-side connector 30.

As described above, in the above embodiment, the operating lever 23 can be swung to be displaced to the three positions, that is, the connected position where the terminals 25 are connected respectively to the terminals in the power receiving-side connector 30, the provisionally-retained position where the connection of the terminals 25 to the respective terminals in the power receiving-side connector 30 is canceled, and the canceled position where the connection of the terminals 25 to the respective terminals in the power receiving-side connector 30 is canceled, and the retaining of the casing 22 on the power receiving-side connector 30 by the lock arms 26 is canceled.

The lever stopper 24 positions the operating lever 23 relative to the casing 22, and also the lever stopper 24, when gripped in the operation of the lever, cancels the positioning of the operating lever 23 relative to the casing 22.

Therefore, the positioning of the operating lever 23 by the lever stopper 24 is canceled by gripping the operating lever 23, and subsequently the operating lever 23 is swung clockwise (FIG. 1), and by these sequential operations, the power feeding-side connector 20 can be disconnected from the power receiving-side connector 30.

Namely, the power feeding-side connector 20 can be disconnected from the power receiving-side connector 30 with the one-action operation with one hand without the need for changing the operator's grip on the connector. Therefore, the excellent operability can be achieved, and the disconnecting operation can be effected rapidly and positively.

The present invention is not limited to the above embodiment, and suitable modifications and improvements can be made. For example, the material, shape, dimensions, form, number, mounting position and so on of the power feeding-side connector, the power receiving-side connector, the terminals, the casing, the housing, the operating lever, the lock arms, the lever stopper and so on are arbitrary, and are not limited in so far as the invention can be achieved.

In the invention, the operating lever can be swung to and positioned at at least three positions, that is, the connected position where the terminals are connected respectively to the terminals in the power receiving-side connector, the provisionally-retained position where the connection of the terminals to the respective terminals in the power receiving-side connector is canceled, and the canceled position where the connection of the terminals to the respective terminals in the power receiving-side connector is canceled, and the retaining of the casing on the power receiving-side connector by the lock arm is canceled.

Therefore, the power feeding-side connector can be disconnected from the power receiving-side connector with one action without the need for changing the operator's grip on the connector. Therefore, the excellent operability can be achieved.

Further in the invention, the operating lever can be swung to and positioned at at least three positions, that is, the connected position where the terminals are connected respectively to the terminals in the power receiving-side connector, the provisionally-retained position where the connection of the terminals to the respective terminals in the power receiving-side connector is canceled, and the canceled position where the connection of the terminals to the respective terminals in the power receiving-side connector is canceled, and the retaining of the casing on the power receiving-side connector by the lock arm is canceled.

The lever stopper is engaged with the predetermined portion of the casing, thereby positioning the operating lever relative to the casing, or the lever stopper is displaced out of engagement with the casing by the gripping of the lever stopper in the operation of the lever, thereby canceling the positioning of the operating lever relative to the casing.

Therefore, the power feeding-side connector can be disconnected from the power receiving-side connector with one action without the need for changing the operator's grip on the connector. Therefore, the excellent operability can be achieved.

What is claimed is:

1. A power feeding-side connector adapted for fitting relative to a power receiving-side connector, wherein said power feeding-side connector and said power receiving-side connector are electrically connected together through a connection of terminals upon a fitting of said power feeding-side and power receiving-side connectors relative to each other, said power feeding-side connector comprising:

a casing;

a housing for accommodating the terminals, mounted in said casing so as to be movable at a predetermined displacement in a connector-fitting direction and a connector-disconnecting direction;

an operating lever swingably supported on said casing in a plane lying in said connector-fitting direction, said operating lever displacing said housing relative to said casing in said connector-fitting direction or said connector-disconnecting direction by a swing thereof; and a lock arm swingably supported on said casing in a plane lying in said connector-fitting direction, for engaging said power receiving-side connector upon the fitting of said power feeding-side connector relative to said power receiving-side connector, thereby positioning said casing relative to said power receiving-side connector;

wherein said operating lever can be swung and positioned among three of a connected position where the terminals are connected respectively to the terminals in said power receiving-side connector, a provisionally-retained position where the connection of the terminals to the respective terminals in said power receiving-side connector is canceled, and a canceled position where the connection of the terminals to the respective terminals in the power receiving-side connector is canceled, and the retaining of said casing on said power receiving-side connector by said lock arm is canceled.

2. A power feeding-side connector according to claim 1, wherein a lever stopper is movably mounted on said operating lever of said power feeding-side connector; and said lever stopper is selectively engagable with a predetermined portion of said casing, thereby positioning said operating lever relative to said casing, and said lever stopper can be displaced out of engagement with said casing by a gripping of said operating lever stopper in an operation of said lever, thereby selectively canceling a positioning of said operating lever relative to the casing.

3. A power feeding-side connector according to claim 2, further comprising a first engagement portion formed on said casing, and a second engagement portion formed on the housing, wherein said lever stopper is urged by a stopper spring and is engagable with said first engagement portion and said second engagement portion, thereby holding said operating lever in the connected position and the provisionally-retained position relative to the casing, respectively.

4. A power feeding-side connector according to claim 1, further comprising a joint bar interconnecting said operating lever and said housing, wherein said operating lever displaces said housing relative to said casing through said joint bar.

5. A power feeding connector apparatus comprising a power feeding-side connector according to claim 1 and a power receiving connector engagable with said power feeding-side connector.

* * * * *